United States Patent [19]
Ritter

[11] 3,915,030
[45] Oct. 28, 1975

[54] VEHICLE DRIVE, PARTICULARLY FOR LIFT TRUCKS OR THE LIKE, HAVING A HYDROSTATIC TORQUE CONVERTER

[75] Inventor: Kaspar Ritter, Kirchheim, Teck, Germany

[73] Assignee: Firma KOPAT Gesellschaft für Konstruktion, Entwicklung und Patentverwertung mbH & Co. KG., Boll, Kreis Goppingen, Germany

[22] Filed: June 6, 1973

[21] Appl. No.: 367,388

[30] Foreign Application Priority Data
Feb. 8, 1973  Germany.......................... 2306053

[52] U.S. Cl. .................... 74/700; 74/15.63; 74/732
[51] Int. Cl.² ........................................ F16H 47/02
[58] Field of Search ............ 74/700, 730, 694, 687, 74/732, 720, 15.63; 60/487, 490, 492

[56] References Cited
UNITED STATES PATENTS

| | | | |
|---|---|---|---|
| 2,494,505 | 1/1950 | Bouchard............................ | 74/700 |
| 3,313,108 | 4/1967 | Allgaier et al. .................... | 60/492 X |
| 3,424,032 | 1/1969 | Ritter................................... | 74/730 |
| 3,763,718 | 10/1973 | Tipping................................. | 74/687 |

Primary Examiner—Samuel Scott
Assistant Examiner—John O. Reep
Attorney, Agent, or Firm—Ernest G. Montague; Karl F. Ross; Herbert Dubno

[57] ABSTRACT

A vehicle drive, particularly for lift trucks or the like which comprises a hydrostatic torque converter for the infinitely variable change in the speed of travel in both directions of travel. The hydrostatic torque converter includes pump- and motor-parts of axial-piston construction. A common valve plate and a sleeve are provided. The pump and motor parts are rotatably supported on both sides of the common valve plate on the sleeve. The pump part of the hydrostatic torque converter is arranged on the side of the common plate cam facing away from the drive side of the converter and is provided with a drive shaft passing through a hollow driven shaft and the sleeve. The drive shaft has an extension projecting out of the converter for driving additional units. A spur gear reduction drive is arranged on the input side of the drive. A counter-shaft extends below the converter. A bevel gear drive and an axle differential, and the motor part of the hydrostatic torque converter is operatively connected by the hollow driven shaft, by the spur gear drive, and the bevel gear drive with the axle differential.

1 Claim, 3 Drawing Figures

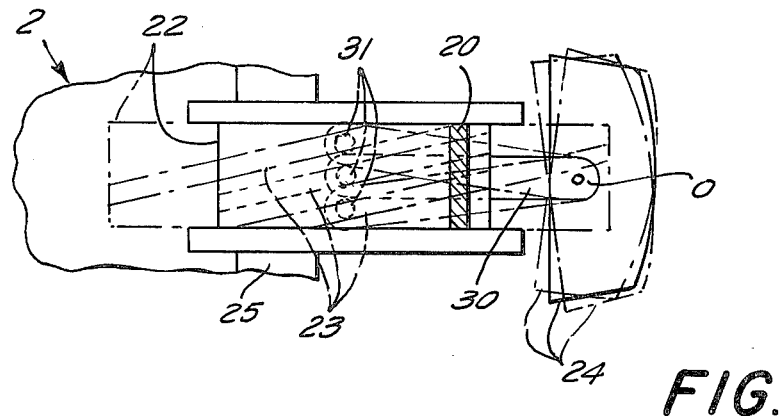
FIG. 4
FIG. 3
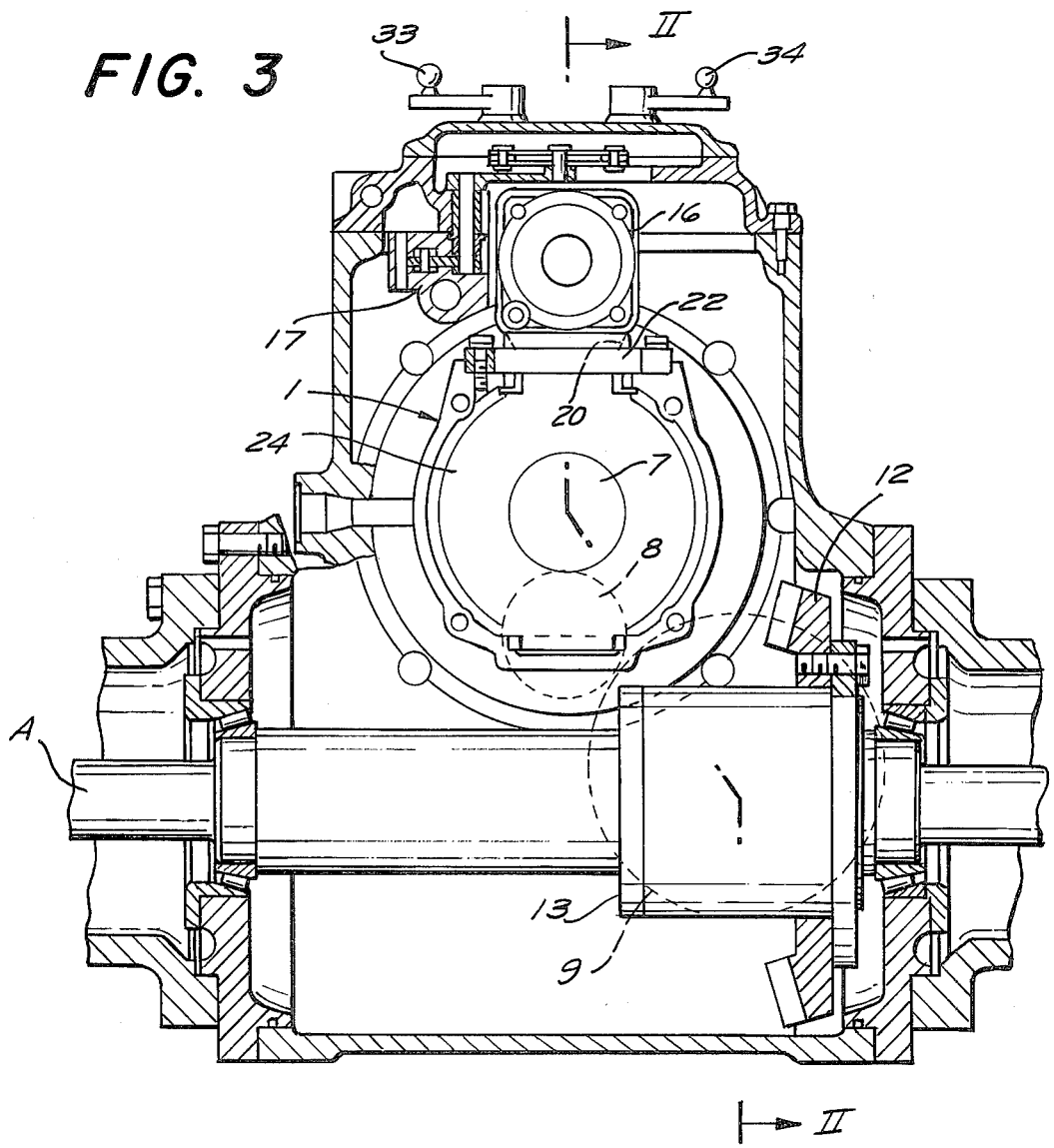

VEHICLE DRIVE, PARTICULARLY FOR LIFT TRUCKS OR THE LIKE, HAVING A HYDROSTATIC TORQUE CONVERTER

FIELD OF THE INVENTION

The present invention relates to a vehicle drive, particularly for lift trucks or the like, with a hydrostatic torque converter for the infinitely variable changing of the speed of travel in both directions of travel.

BACKGROUND OF THE INVENTION

Such vehicle drives are already known in numerous types. However, particularly in case of compact drives, which is greatly desired due to the operating and installation advantages thereof, with a pump and motor part of the torque converter combined in a common housing, they have such large dimensions, as the result of a rather complicated construction, that lift trucks equipped with them have a wheel base which impairs their maneuverability and/or their stability against tipping.

OBJECT OF THE INVENTION

It is one object of the present invention to provide a drive of the said type which, with the smallest possible overall dimensions and considerably simplified construction, has in particular smaller distances both between the motor connecting flange and the gear drive shaft in the longitudinal direction of the vehicle and between the drive shaft and the wheel drive shaft in vertical direction as compared with the transmittable motor power as well as a possibility of free connection in a continuous drive for a filling pump or similar auxiliary units.

SUMMARY OF THE INVENTION

This object is achieved in accordance with the present invention essentially by the combination of the following:

a. The pump and motor parts of the hydrostatic torque converter in axial-piston construction are rotatably supported on both sides of a valve plate on a sleeve which is supported in the valve plate.

b. The pump part of the hydrostatic torque converter is arranged on the side of the valve plate facing away from the drive side of the converter and is provided with a drive shaft which passes through the hollow drive shaft and the sleeve of the valve plate, which drive shaft at the same time has an extension protruding from the converter for driving auxiliary units such as a filling pump, further hydraulic (high-pressure) pumps or the like, c. The motor part of the hydrostatic torque converter is operatively connected via the hollow driven shaft and a spur gear step-down drive arranged on the drive input side and a counter shaft extending below the converter and a bevel drive with the shaft differential.

With this drive, the known arrangement opposite each other of the pump and motor parts on both sides of a valve and the supporting of the piston drums on a sleeve supported in the valve plate assure an extremely short structural length. By the use of a sleeve for the supporting of both piston drums, there has been created, in combination with the arrangement of the pump part on the side of the valve facing away from the drive side of the converter, the possibility of installing a drive shaft which passes through the hollow driven shaft and the entire converter and has an extension extending out of the converter for driving any desired additional units such as a filling pump, another hydraulic pump and the like. However, it is only the combination of features (a) to (c) which has made possible the double reversal of the direction of flow of force by 180° within the drive with only two parallel extending shafts offset only slightly more than half the diameter of the converter from each other, which is of decisive importance for reduction both of the overall length of installation of the drive and of the distance between the motor input shaft of the drive and the axle shafts.

One advantageous further development of the vehicle drive of the present invention resides in the fact that a known servo adjustment device for the torque converter consisting of a displacement cylinder arranged movable in the longitudinal direction of the drive, but in non-rotatable manner on a fixed piston rod with piston is firmly mounted on the inside of a housing cover, of the cylinder being in formfitting engagement, when the cover is placed on, in a corresponding groove of a control slide guided for longitudinal movement on the outside of the converter and provided on its inside with a cam for the actuating of the tiltable swinging body or bodies of the pump and/or motor part located in the converter housing.

By such a development and arrangement of the servo adjustment cylinder for the hydrostatic converter, a smaller amount of space is required, together with a particularly simple possibility of mounting and easy accessibility to the adjustment cylinder, which can be removed jointly with the drive cover from the housing without having to loosen any hydraulic connecting parts.

In this connection, it lies within the scope of the present invention, that a control block belonging to the servo adjustment device for the torque converter and having a mechanical feed back device is also arranged on the inside of the housing cover and only one or two actuating members, respectively for the adjustment is extending out of the housing cover. In this way all necessary pressure-fluid connections can be constructed in particularly simple manner from oil ducts within the individual parts. At the same time, due to the elimination of all line connections lying outside of the drive housing, for the servo adjustment device, the number of possible points of leakage is substantially reduced.

These and other objects will become apparent from the following detailed description, reference being made to the accompanying drawing, in which:

FIG. 1 is a schematic side elevation of a vehicle drive, in accordance with the present invention as a part of a drive block for a lift truck at greatly reduced scale;

FIG. 2 is an axial section through the drive of FIG. 1 on an approximately 5-times larger scale along the lines II–II of FIG. 3;

FIG. 3 is a cross section of the drive along lines III—III of FIG. 2 and

FIG. 4 is a section taken along line IV—IV of FIG. 2.

Figures 1, 2:
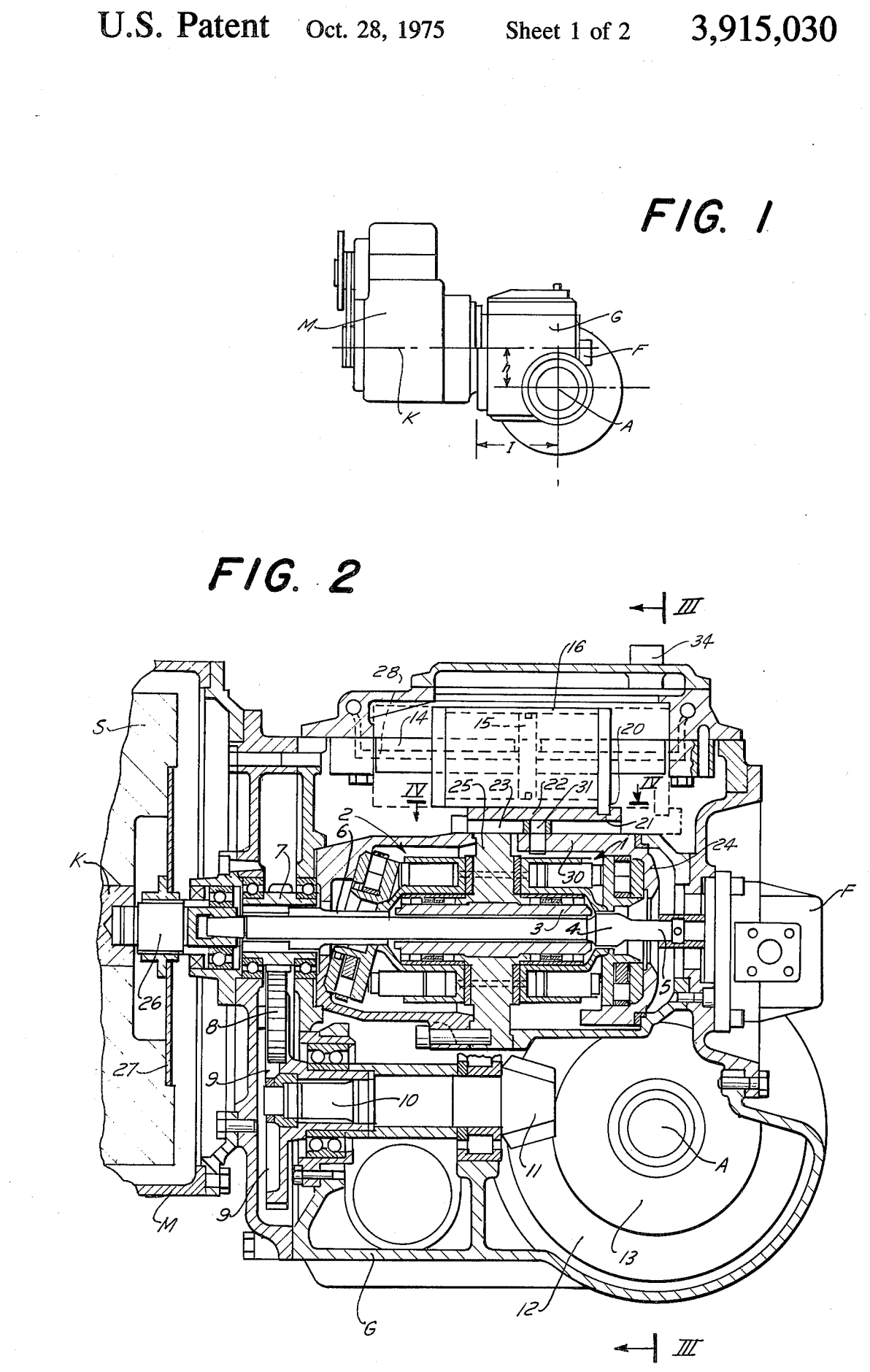

Referring now to the drawing, the drive G is intended to be combined in accordance with FIG. 1 with an internal combustion engine M to form a drive block for a lift truck. For such vehicles it is of great importance, to have a drive available, which has both the smallest possible longitudinal distance L between connecting flange and wheel drive shaft A and the smallest possible vertical distance $h$ between the crankshaft axis K and the wheel drive shaft A, so as to obtain a short wheel base and a low position of the center of gravity for the lift truck. In the longitudinal and transverse sections through the vehicle drive G shown in FIGS. 2 and 3, the arrangement of the essential parts is shown. As can best be noted from the axial section of FIG. 2, the torque converter of axial-piston construction, which serves for the infinitely variable change of the speed of the vehicle consists of a pump part 1 and a motor part 2, which are rotatably supported on both sides of a valve plate 25 on a sleeve 3 supported in the latter. In this connection the pump part 1 is arranged on the side of the valve plate facing away from the drive side and is operatively connected via the shaft 4, for instance by an intermediate member 26, as well as a clutch disk 27, with the flywheel S, indicated in dashed lines, on the crankshaft K of the internal combustion engine M. The drive shaft 4 passes simultaneously through the driven shaft 6 which is also hollow and connects the motor part 2 of the torque converter with the pinion 7 of the first stage, consisting in this case of a total of three spur gears 7, 8 and 9, of the mechanical supplementary reduction gearing. The spur gear 9 of this reduction stage is arranged fixed for rotation on the driveside end of a counter-shaft 10, which at its other end bears the pinion 11 which, together with the crown wheel 12, forms the second supplementary reduction stage of the power transmission up to the differential 13 arranged on the drive shaft A. The drive shaft 4 for the pump part 1 of the hydrostatic converter is provided with a pin 5 extending out of the converter, which pin 5 in this case serves for driving a filling pump F with the instantaneous speed of rotation of the drive motor M. Instead of the filling pump F or in addition to it, any other auxiliary apparatus, such as, for instance, one or more additional (high pressure) hydraulic pumps can, however, also be driven by the shaft 4 passing through the converter for the lifting device, a servo linkage or the like of a lift truck. On the inside of a removable cover 19 of the drive G there is arranged the entire servo adjusting device for the hydrostatic converter. It consists essentially of a piston rod 14 rigidly supported on the cover and provided with bore holes 28, 29, said rod bearing the piston 15 on which a displacement cylinder 16 is arranged movable in the longitudinal direction of the drive. The cylinder 16 is provided with a driving strip 20 which, when the covering is placed on, engages into a corresponding groove 21 of a control slide 22 guided for longitudinal movement on the converter, so that said control slide is coupled with the displacement cylinder 16 for movement together with it. In the embodiment shown in FIGS. 2 and 4 by way of example, the control slide 22, via a cam 23 arranged on its inside, displaces a pin 31 with roller 32 arranged on the arm 30 and the swing body 24 of the pump part of the converter to different oblique angles with respect to the axis of the converter, about an axis "O" as shown in U.S. Pat. No. 3,313,108, for example, and thereby changes in infinitely variable fashion the delivery volume and direction of delivery of the pump part 1. In converters with volume-variable pump and motor parts, of course, also the swing bodies of the pump and motor parts can be displaced by a correspondingly longer control slide in a ratio determined by the design of the cam. As can best be noted from FIG. 3, of the drawing, the control block 17 belonging to the servo displacement and having a mechanical return device is also arranged on the inside of the control cover 19 from which, in the embodiment shown by way of example, only two separately actuating levers 33, 34 extend for control for forward and reverse travel, for instance, by two separate pedals (not shown), the device 17 operating as shown, for example, on pages 396 and 407 of *Servo-mechanism Practice* by W. R. Ahrendt and C. I. Savant published by McGraw-Hill (see also U.S. Pat. Nos. 3,175,365 and 3,061,032.

While I have disclosed several embodiments of the present invention, it is to be understood, that these embodiments are given by example only and not in a limiting sense.

I claim:

1. A hydrostatic torque converter for driving a vehicle comprising:

a housing;

a first horizontal drive shaft rotatably mounted in said housing;

means engageable with a first end of said first drive shaft for imparting rotary motion thereto;

an axial-piston pump at a second end of said first drive shaft, coaxial therewith and engaged thereby, said pump having a swing body surmounting said first drive shaft for adjustment of the piston stroke thereof;

an upwardly extending pin on said swing body;

an axially slidable cam disposed above said swing body and engaging said pin for the swinging displacement of said swing body relative to said housing;

a horizontally displaceable cylinder above said cam and connected therewith;

a nondisplaceable piston head disposed within said cylinder;

a connecting rod horizontally mounted on said housing and extending from either side of said piston head and passing through the ends of said cylinder;

bores provided in each of said connecting rods communicating with the interior of said cylinder on either side of said piston head and connected with a source of pressurized fluid for the displacement of said cylinder;

means for controlling the flow of said pressurized fluid;

an axial-piston motor driven by said axial-piston pump surrounding said first drive shaft between said means for imparting rotary motion and said axial-piston pump;

a first spur gear rotatably mounted relative to said first drive shaft between said means for imparting rotary motion and said axial-piston motor and driven by said axial-piston motor;

a second spur gear mounted in said housing and driven by said first spur gear;

a second horizontal drive shaft rotatably mounted in said housing beneath said first drive shaft and parallel thereto;

a third spur gear engaging a first end of said second drive shaft and driven by said second spur gear;

a pinion mounted at a second end of said second drive shaft;

a third horizontal drive shaft rotatably mounted in said housing transverse to said first drive shaft and said second drive shaft and lying within the length of said first drive shaft;

a valve plate surrounding said first shaft and common to said motor and said pumps;

a sleeve mounted in said valve plate and surrounding said first shaft while carrying said motor and said pump;

a bevel crown wheel mounted on said third drive shaft and having an upper portion substantially at the level of said first drive shaft and driven by said pinion; and an extension provided at said second end of said first drive shaft for driving an external apparatus at a constant speed by said means for imparting rotary motion.

* * * * *